United States Patent [19]

Lässig et al.

[11] 4,234,287
[45] Nov. 18, 1980

[54] LOAD HANDLING RAILROAD VEHICLE

[75] Inventors: Harry Lässig; Anton Grosshauser, both of Hamburg-Schenefeld, Fed. Rep. of Germany

[73] Assignee: Fördertechnische Forschungsgesellschaft mbH, Hamburg-Schenefeld, Fed. Rep. of Germany

[21] Appl. No.: 952,843

[22] Filed: Oct. 19, 1978

[30] Foreign Application Priority Data

Aug. 4, 1978 [DE] Fed. Rep. of Germany ....... 2834163

[51] Int. Cl.³ .................... B60P 1/54; B66C 7/10
[52] U.S. Cl. .................... 414/542; 212/182; 212/208
[58] Field of Search ........... 414/342, 348, 542, 543; 212/13–15, 73, 145

[56] References Cited

U.S. PATENT DOCUMENTS 2,812,688  2/1955  Crile .................... 414/542

FOREIGN PATENT DOCUMENTS 1755402  8/1971  Fed. Rep. of Germany .......... 414/542

*Primary Examiner*—Robert G. Sheridan
*Attorney, Agent, or Firm*—Toren, McGeady and Stanger

[57] ABSTRACT

A railroad vehicle is constructed with a platform for supporting containers and with a device for moving the containers laterally off and on the platform. The device also includes a pair of supporting frames on the ends of the platform with a jib pivotally mounted on each supporting frame and movable between a swung-in position along the platform and a swung-out position extending laterally outwardly from the platform. Each supporting frame and jib form a trackway. A crane bridge extends between the trackways and supports a loading frame. Further, a device is pivotally connected to each supporting frame for supporting the jib in the swung-out position.

3 Claims, 3 Drawing Figures

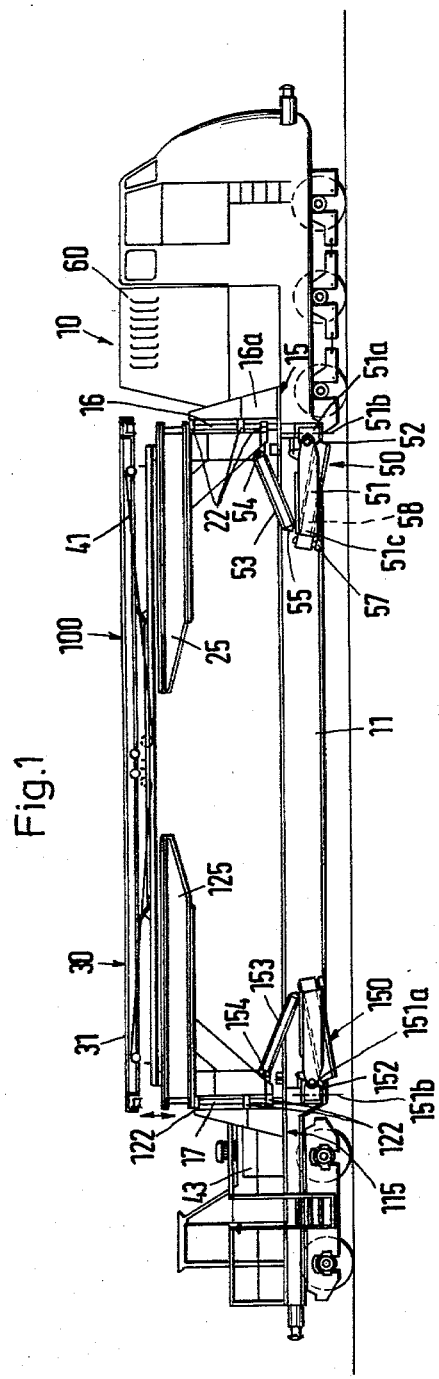

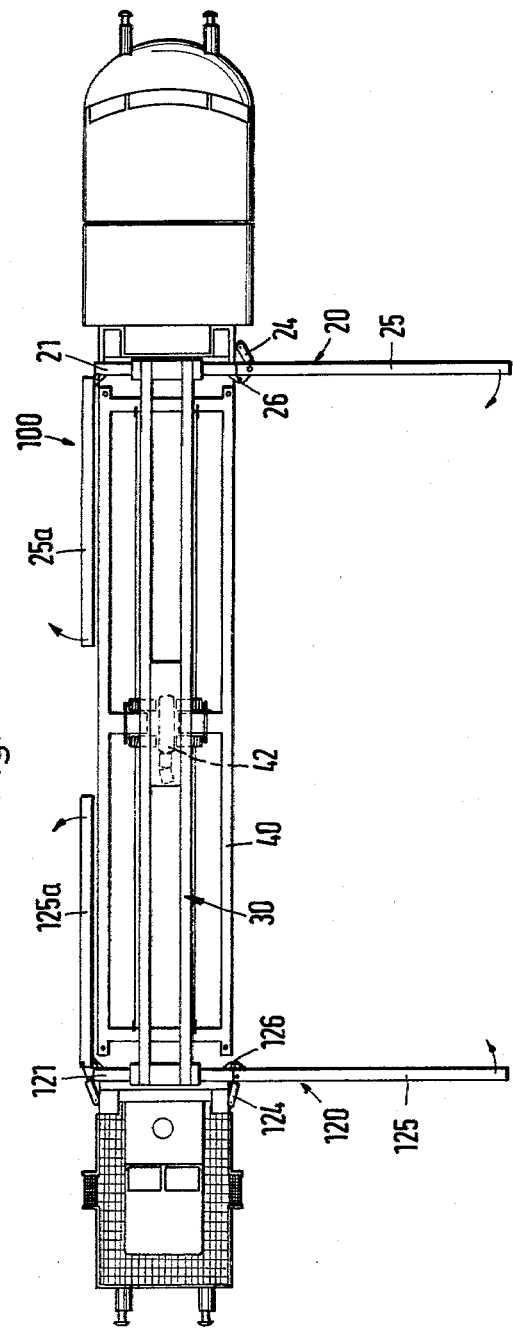

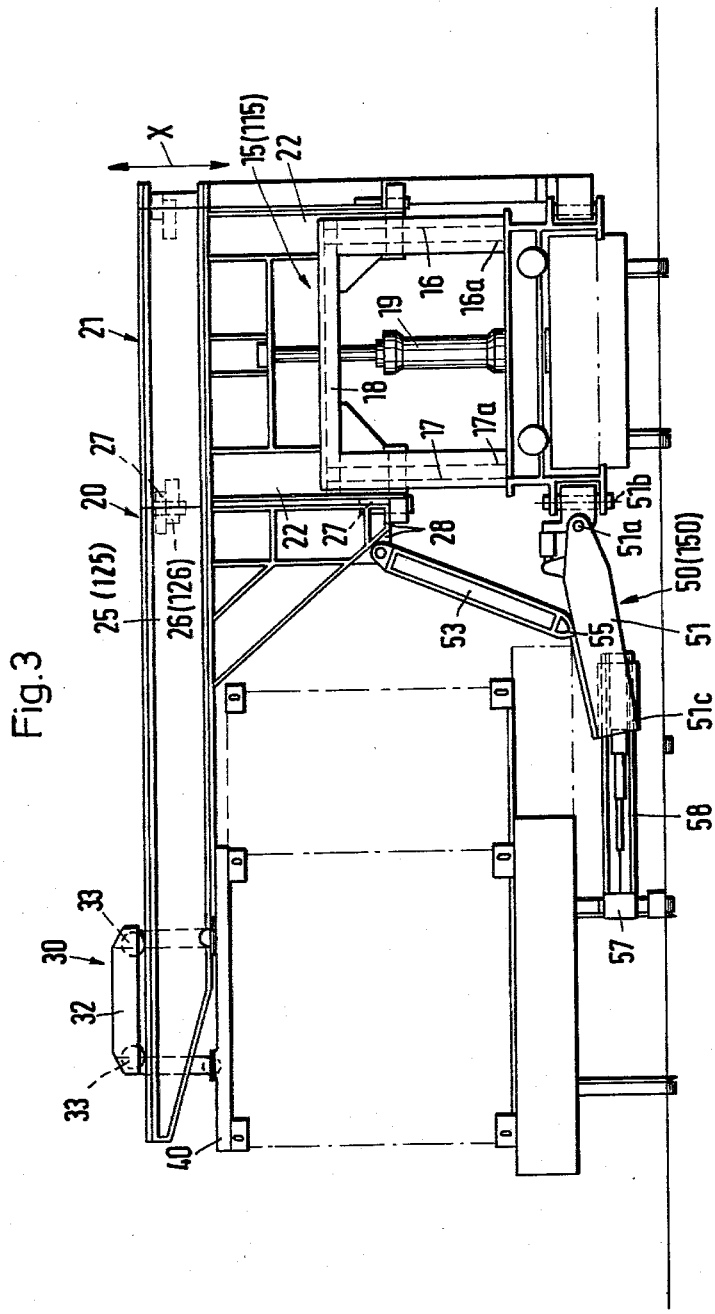

LOAD HANDLING RAILROAD VEHICLE

The invention relates to a railroad vehicle for transferring receptacles, such as containers to sidings or the like located alongside the vehicle and in particular below the overhead lines for electrically driven locomotives or units, said vehicles having a platform for receiving the container and a transfer apparatus comprising two parallel trackways for a loading frame receiving the container arranged at the platform ends at right angles to the longitudinal direction thereof and two height-adjustable jibs carrying the trackways with trackway portions permitting the lateral movement of the containers which are connected to the trackways when the jibs are swung out.

Hitherto, it has only been possible to transship railroad containers at terminals, whose tracks are not provided with overhead lines. Thus, a train drawn by an electric locomotive must be uncoupled from the latter prior to loading or unloading and is then moved into the unloading track with a shunting locomotive. Following loading or unloading the train is shunted out of the loading track by means of the shunting locomotive and is then coupled up to the electric locomotive.

Due to time lost during this procedure, container trains cannot serve intermediate stations in which containers must be loaded and unloaded and instead the trucks to be loaded and unloaded are shunted in and out at these locations. Therefore, a block train system can be obtained and consequently containers are mainly used on express freight systems.

Tests and research have shown the advantages of loading and reloading container from trucks compared with the conventional shunting procedure and various solutions for loading and unloading at intermediate stations have been proposed.

Thus, inter alia a transhipment system for containers and pallets with preparation ramps is known with which are associated loading and unloading devices for road vehicles, as well as tracks for container trains, whilst having roller conveyors for computer-controlled movements of the containers. In this known transhipment system, the ramps provided with transversely conveying roller units have in their longitudinal centre equal-level longitudinal conveying systems with transversely conveying roller units, whereby the rollers of the roller units and the rollers of the transversely conveying roller units located at the trucks are adapted as regards shape and size to the grooves on the bottom of the container or pallet and are arranged in accordance with a modulus.

All the existing solutions require significant changes to the existing system in the initial stage, so that considerable expenditure is involved. Following the introduction of the proposed solutions, it would not be possible to achieve a complete integration with the existing railroad shunting system.

Very varied constructions for container transfer mechanisms fitted to vehicles are known.

Thus, a vehicle with a transfer mechanism for containers or the like is known comprising a frame arranged above the vehicle platform and whose height can be changed by means of hydraulic jacks. This frame which moves in the longitudinal direction of the vehicle platform has in each of its end areas a jib which is telescopically movable at right angles to the longitudinal direction of the platform truck, whereby each of the free ends of the jib carry a loading frame for hanging in the container. Each loading frame is fitted to the telescopically movable jib in such a way that with its one end the frame is fixed to the free end of the outer extendable jib, whilst the rear frame end is guided on the jib in such a way that on extending the jib the frame is carried along by the outer jib, whilst the free end of the frame is held and guided on said jib. In addition, this vehicle which has the transfer mechanism is provided with base supports which permit a perpendicular support and as a result long jibs cannot be used for vehicle stability reasons. In addition, this known transfer mechanism is constructed in such a way that the containers can only be transferred to one side and namely to that side of the platform truck on which the jibs can be extended. Thus it is not possible to transfer the load to a siding located on the other side of the vehicle. The possibility of adjusting the height of the jib with the loading frame permits the superimposed stacking of a plurality of containers (British Pat. No. 1,277,001).

Another known transshipping mechanism for containers and railroad vehicles comprises a crane bridge which moves on guide rails at right angles to the longitudinal direction of the vehicle and which on either side and specifically at right angles to the vehicle longitudinal direction has extendable and retractable jibs carrying compactly constructed crane trolleys and lifting members. In this known transshipment mechanism, the crane bridge is located at right angles to the longitudinal direction of the vehicle and is movable parallel to the latter, whilst the jibs and crane trolleys are extendable and retractable at right angles to the vehicle longitudinal direction (German Pat. No. 827,321).

In yet another known transfer mechanism in the form of a lifting and sliding mechanism for roofed railroad trucks, a crane bridge-like supporting frame with an extendable and retractable jib is arranged below the roof of a railroad vehicle and at right angles to its longitudinal direction, whereby over the free end of the jib is arranged a hoisting cable for the load to be transshipped. The supporting frame can be moved in the longitudinal direction of the vehicle by guide rails running in said direction (German Pat. No. 434,212).

Another transfer apparatus for transferring loads from railroad trucks is constructed in such a way that it is possible to transfer the load to either side of the truck. To this end, the transfer apparatus comprises two guide rails for the transfer vehicle or loading frame which run on the vehicle platform and at right angles to the longitudinal direction thereof. Two lateral extendable and retractable jibs carrying further trackways are positioned laterally of the platform and in the vicinity of the two guide rails for the transfer vehicle. These trackways are constructed in such a way that with the jibs in the swung out position, their trackways follow onto the trackways on the vehicle platform, so that the transfer vehicle can be removed laterally out of the truck interior. Furthermore, the two jibs on either side of the platform are constructed in height-adjustable manner, so that it is possible to transship a load from the higher platform of the track vehicle to a lateral siding or the like at a lower level. However, it is disadvantageous of this known construction that the transfer vehicle is not suitable for large containers and can only receive a small load which can be moved out of the truck by means of the transfer vehicle using a closable opening in the truck sidewall (U.S. Pat. No. 758,493).

BRIEF SUMMARY OF THE INVENTION

The problem of the present invention is therefore to provide a railroad vehicle for transferring containers onto sidings or the like positioned laterally of the vehicle which, whilst maintaining the prescribed free profile of the railroad or whilst maintaining the clearance limits can be moved on tracks and which permits a large number of transshipment processes of loading units with the most varied loading or unloading points below the overhead lines on any random track with an adequate free clearance and at the same time maximum stability of the vehicle during operation.

According to the invention, this problem is solved by a railroad vehicle of the type defined hereinbefore and which is characterised by the following features:

(a) On a vehicle platform is provided a transfer mechanism having two spaced perpendicular, gantry-shaped supporting frames which carry, at right angles to the longitudinal direction of the platform, trackways for a crane bridge with a loading frame, (b) on one or both sides, the two supporting frames carry in the vicinity of the two trackways tubes which can be swung in and out about vertical axes with in the swung-in position trackways which connect up to the first-mentioned trackways for the lateral moving out of the container, (c) the first-mentioned trackways together with the second-mentioned trackways in the swung-in state of the jibs can be lowered into the lateral area of the container by means of the height-adjustable supporting frames, (d) the platform has lateral, longitudinally movable base support devices which can be swung in and out with the jibs, (e) the base support devices are terminally provided in each case with a horizontally directed support arm with a support head which can be placed on the siding or subsidiary track, (f) each base support device comprises a swivel arm articulated to the platform in the vicinity of each supporting frame and laterally pivotable with the pivotable jib, whereby on said swivel arm is supported by means of a hydraulic cylinder or the like the lower swivel hinge of the pivotable jib and on whose free end is provided the support arm with the support head.

Thus, according to the invention, the per se known vertical, height-adjustable supporting frames carrying the two trackways are constructed in gantry-like manner, a per se known crane bridge for the loading frame located parallel to the longitudinal direction of the vehicle platform is located on the two trackways and the trackways with the trackway portions arranged on the jibs which can be swung in and out in the state of the jibs swung in parallel to the direction of travel are constructed so as to be lowerable into the lateral area of the container, the gantry frame being provided with per se known lateral and longitudinally movable base support devices which can be swung in and out with the jibs and which at the free ends are provided with approximately horizontally moving support arms with in each case a support head which can be placed on the siding or secondary track.

The following advantages are achieved by such a railroad vehicle for transferring containers to sidings positioned laterally of the vehicle:

Travel on the track whilst maintaining the prescribed free profile of the railroad Possibility of transferring loading units to the transshipment mechanism Performance of transshipment processes of loading units with the following loading or unloading points:
(a) Loading onto a truck standing on a secondary track.
(b) Loading onto a road truck positioned parallel to the railroad vehicle.
(c) Loading onto the loading platform of the railroad vehicle with transfer apparatus.
(d) Placing containers on the ground.
(e) Placing containers on a ramp, including the corresponding reverse loading processes.

As the projection of the apparatus is adapted to the maximum track spacing, it is also possible to service closely juxtaposed tracks.

Possibility of working beneath the overhead lines on any track with adequate free space or clearance.

Self-propulsion and possibility of travel on main line of the transshipment apparatus.

Use of equipment for transferring several trucks,

Transshipment of loading units constructed as 10′, 20′ or 40′ ISO or German Federal railroad containers or, provided with auxiliary sling chains, for transferring changeable structures.

Furthermore, the invention provides for the construction of the base support device which comprises a swivel arm articulated to the platform in the vicinity of each supporting frame and laterally pivotable with the pivotable jib, whereby on said swivel arm is supported by means of a hydraulic cylinder or the like the lower swivel hinge of the jib which can be swung out and on whose free end is provided the support arm with the support head.

As a result of this construction of the base support device, not only is the stability of the railroad vehicle ensured in the operating state during the transshipment process, but also the possibility is provided of using jibs which project out a long way without it being necessary to provide additional equipment for stabilising the railroad vehicle. As the base support devices of the vehicle can be connected to the rails of adjacent tracks, optimum vehicle stabilisation is achieved. The simultaneous support of the jibs on the special construction of the base support devices is of particular importance.

BRIEF DESCRIPTION OF THE DRAWINGS

The invention is described in greater detail hereinafter relative to a non-limitative embodiment and with reference to the attached drawings, wherein show:

FIG. 1 a railroad vehicle for transferring containers in side view.

FIG. 2 a plan view of the transfer mechanism with laterally swung out jibs with trackways for the crane bridge with the loading frame.

FIG. 3 an enlarged plan view of the transfer mechanism of FIG. 2.

DETAILED DESCRIPTION OF THE PREFERRED EMBODIMENTS

According to FIGS. 1 and 2, the railroad vehicle for transferring or transshipping containers of the like to sidings positioned laterally of the vehicle comprises a platform truck or flat car 10 with a platform 11 which can be moved along tracks and which carries a mechanism 100 for transferring the containers. The platform truck 10 can be provided with a motor and traction drive unit 60 for self-propulsion and for travelling along the main track. The transfer mechanism 100 has, at right angles to the longitudinal direction of the vehicle, trackways 21 and 121 for a crane bridge 30 with a loading frame 40 which is constructed in per se known manner. In addition, the vicinity of the two trackways 21 and 121 and specifically on one or both sides of the vehicle, there are jibs 25 and 125 or 25a and 125a which can be swung in and out and which by means of vertical pivot pins can be articulated to vertical, gantry-shaped supporting frames 15 and 115 arranged on platform 11. These supporting frame 15 and 115 carry the two crane bridge trackways 21, 121 and can also be raised and lowered by means of hydraulic jacks or corresponding otherwise constructed suitable devices 19.

As supporting frame 15 is constructed in the same way as supporting frame 115, only frame 15 will be described in greater detail hereinafter. The gantry-shaped frame 15 has vertical guide rods 16, 17 which are interconnected by a connecting member 18. Supporting frame 15 is fixed to the platform 11 of platform truck 10 by the lower ends of guide rods 16, 17 and the free ends of lateral members 16a, 17a.

Each trackway 21, 121 for crane bridge 30 is provided with guides 22, 122 which are guided in or on vertical guide rods 16, 17 of supporting frame 15, 115 (FIG. 3). By means of hydraulic jack 19, trackways 21, 121 can be raised and lowered in the direction of arrow X in frames 15, 115.

At least one free end of each crane bridge trackway 21, 121 has jibs 25, 125, which also have trackways 20, 120 for crane bridge 30. Jibs 25, 125 with trackways 20, 120 are arranged in such a way that in the swung-out state of jibs 25, 125 their trackways 20, 120 are connected to trackways 21, 121 on the two supporting frames 15, 115 (FIG. 2). Jibs 25, 125 can be pivoted about vertical pivot pins 26, 126. Jibs 25, 125 are fixed to pivot pins 26, 126 at 27 (FIGS. 2 and 3). Jibs 25, 125 are pivoted by means of hydraulic cylinders or the like 24, 124 (FIG. 2). However, as can be gathered from FIG. 2 a laterally pivotable jib 25, 125 as well as 25a, 125a is articulated to both ends of each trackway 21, 121. In the present embodiment, trackways 21, 121 constitute the hydraulically raisable and lowerable crane trackway central portion. The laterally pivotable jibs 25, 125 and 25a, 125a are pivotably articulated in the vicinity of trackways 21, 121 in such a way that on reaching the working position, they can be horizontally swung out to one or both sides, so that crane bridge 30 can be moved to the end of the swung-out jib.

Crane bridge 30 movable on trackways 21, 121 and 20, 120 has a longitudinal member 31 which interconnects the two trackways 21, 121 or 20, 120 and which at its ends is provided with transverse members 32 carrying rollers 33 guided on trackways 21, 121 or 20, 120 (FIGS. 1 and 3).

A loading frame 40 is attached to crane bridge 30 and can take up 10′, 20′, 30′, 40′ containers or 40′ long combinations. At its corners and centrally, loading frame 40 is suspended on crane bridge 30 by a total of 8 cables 41 which lead to a hydraulically or otherwise driven winch 42 in the centre of the crane bridge. As a result, loading frame 40 can be raised and lowered. The hydraulic pump 43 and the control device 44 for transferring mechanism 100 are arranged at the end of platform truck 10 opposite to the motor and traction drive unit 60 (FIG. 1). Unit 60 has a further control stand, but only with the control elements required for main line travel. On transporting containers on the main line, jibs 25, 125 and 25a, 125a are lowered, so that they are retracted laterally of the container. Loading frame 40 with crane bridge 30 is then located on the container and is not supported on the crane bridge tracks, so that it is possible to respect the free profile of the railroad.

High stability is achieved as a result of the base support devices 50, 150, which can be swung out laterally with the jibs 25, 125 and which are supported on the secondary track rail on the transshipment mechanism side. The number of base support devices used is dependent on the number of pivotable jibs 25, 125, 25a, 125a used. In the embodiment of FIGS. 1 and 2 a base support device is provided on each pivotable jib. As all the base support devices are constructed identically and as base support device 50 corresponds to base support device 150, only device 50 is described in greater detail hereinafter (FIG. 3).

Base support device 50 comprises a swivel arm 51 which at 52 is articulated to platform 11 of platform truck 10 in such a way that arm 51 can be swivelled both about a horizontal axis 51a and a vertical axis 51b. Furthermore, swivel arm 51 is connected by means of hydraulic cylinder 53 with the swivel bearing 28 of the jib which can be swung out, so that swivel bearing 28 can be supported on swivel arm 51. At 54, one end of hydraulic cylinder 53 is fixed to swivel bearing 59 of the jib which can be swung out sideways and at 55 its other end is fixed to swivel arm 51 in such a way that the hydraulic cylinder 53 can follow the swivelling movements of swivel arm 51 (FIGS. 1 and 2).

The length of swivel arm 51 can be modified by means of a telescopic supporting arm 58, which is also articulated to end 51c of arm 51 and has at its free end a head 57 for supporting on the secondary track. This construction of the base support device makes it possible to support the platform truck on the secondary track rail on the transshipment mechanism side on putting the transfer mechanism into operation. A direct derivation of moment is obtained in that the lower swivel hinge, indicated at 28 in FIG. 3, of the cantilever-like crane trackway portion which can be swung out is supported with hydraulic cylinder 53 on the supporting mechanism, i.e. on swivel arm 51.

The parts of base support device 150 are identical with those of device 50 and are designated by 151, 151a, 152, 153 154 and 155.

The invention is not limited to the embodiments described and represented hereinbefore and various modifications can be made thereto without passing beyond the scope of the invention.

We claim:
1. A railroad vehicle for transferring containers and the like onto sidings positioned laterally of the vehicle, particularly below the overhead lines for electrically operated locomotives and units, characterized in that the combination of the following features is provided:
(a) a railroad vehicle platform capable of being moved along railroad tracks, a transfer mechanism supported on said vehicle platform and including two spaced vertically disposed, gantry-shaped supporting frames extending transversely of the direction of movement of said vehicle platform along railroad tracks, a platform trackway supported on and extending in the direction of each of said supporting frames, a crane bridge supported on and extending between said platform trackways with a loading frame movably mounted on said crane bridge.

(b) a jib supported on at least one side of each of said supporting frames adjacent said trackway thereon, each said jib being swingable about a vertical axis between a swung-in position extending in the direction of movement of said vehicle platform along railroad tracks and a swung-out position extending laterally outwardly from said vehicle platform and transversely of the direction of movement of said vehicle platform along railroad tracks, each said jib having a jib trackway which aligns with and connects to one of said platform trackways in the swung-out position for laterally moving a container, (c) means associated with said supporting frames so that said jib trackways together with said platform trackways in the swung-in position of said jibs can be raised and lowered, (d) movable base support devices on said vehicle platform which can be swung in and out with said jibs, (e) each said base support device includes a horizontally directed support arm with a support head at an end thereof which can be placed on a siding or subsidiary track, (f) each base support device comprises a swivel arm articulated to said vehicle platform in the vicinity of each said supporting frame and is laterally pivotable with said pivotable jib, a hydraulic cylinder mounted on one end of said swivel arm, each said pivotable jib having a lower swivel hinge, the other end of said hydraulic cylinder attached to said lower swivel hinge, and the end of said swivel arm spaced from said vehicle platform is articulated to said support arm with said support head.

2. A railroad vehicle for transferring receptacles, such as containers to sidings or the like located alongside the vehicles and in particular below the overhead lines for electrically driven locomotives or units, said vehicle having a longitudinally extending platform for receiving a container, a transfer apparatus mounted on said platform and comprising two parallel trackways arranged at the platform ends and extending generally at right angles to the longitudinal direction of said platform, a loading frame movably supported on said platform trackways for movement thereon laterally of the longitudinal direction of said platform, two height-adjustable jibs pivotally movable between a swung-in position aligned with the longitudinal direction of said platform and a swung-out position extending laterally outwardly from said platform and transversely of the longitudinal direction of said platform, and said jib carrying a portion of said trackways with said trackway portions permitting the lateral movement of the containers outwardly from said platform when said jibs are in the swung-out position, characterized in that vertically extending height-adjustable supporting frames pivotally mount said jibs and support the remaining portions carrying the two of said trackways, said supporting frames are constructed in gantry-like manner, a crane bridge supporting said loading frame and located parallel to the longitudinal direction of said platform is movably supported on said two trackways, and said trackways and trackway portions arranged on the jibs and being movable therewith between the swung-in and swung-out positions of said jibs and being lowerable into the lateral area of the container, the gantry shaped supporting frame including laterally and longitudinally movable base support devices which can be swung in and out with the jibs and horizontally movable support arms supporting the free ends of said support device, said support arms each having a support head arranged to be placed on the siding or secondary track.

3. A railroad vehicle according to claim 2, characterized in that each said base support device comprises a swivel arm articulated to said platform in the vicinity of each said supporting frame, said swivel arm being laterally pivotable with said pivotable jib and said swivel arm includes a hydraulic cylinder, each said jib includes a lower swivel hinge, said hydraulic cylinder connected to said swivel hinge so that said swivel arm can be swung out and said swivel arm having a free end spaced outwardly from said platform and connected to said support arm with the support head.

* * * * *